Oct. 26, 1965 A. H. WAKEMAN ETAL 3,214,146
AGITATOR AND DASHER ASSEMBLY FOR ICE CREAM FREEZERS
Filed Oct. 2, 1964 2 Sheets-Sheet 1
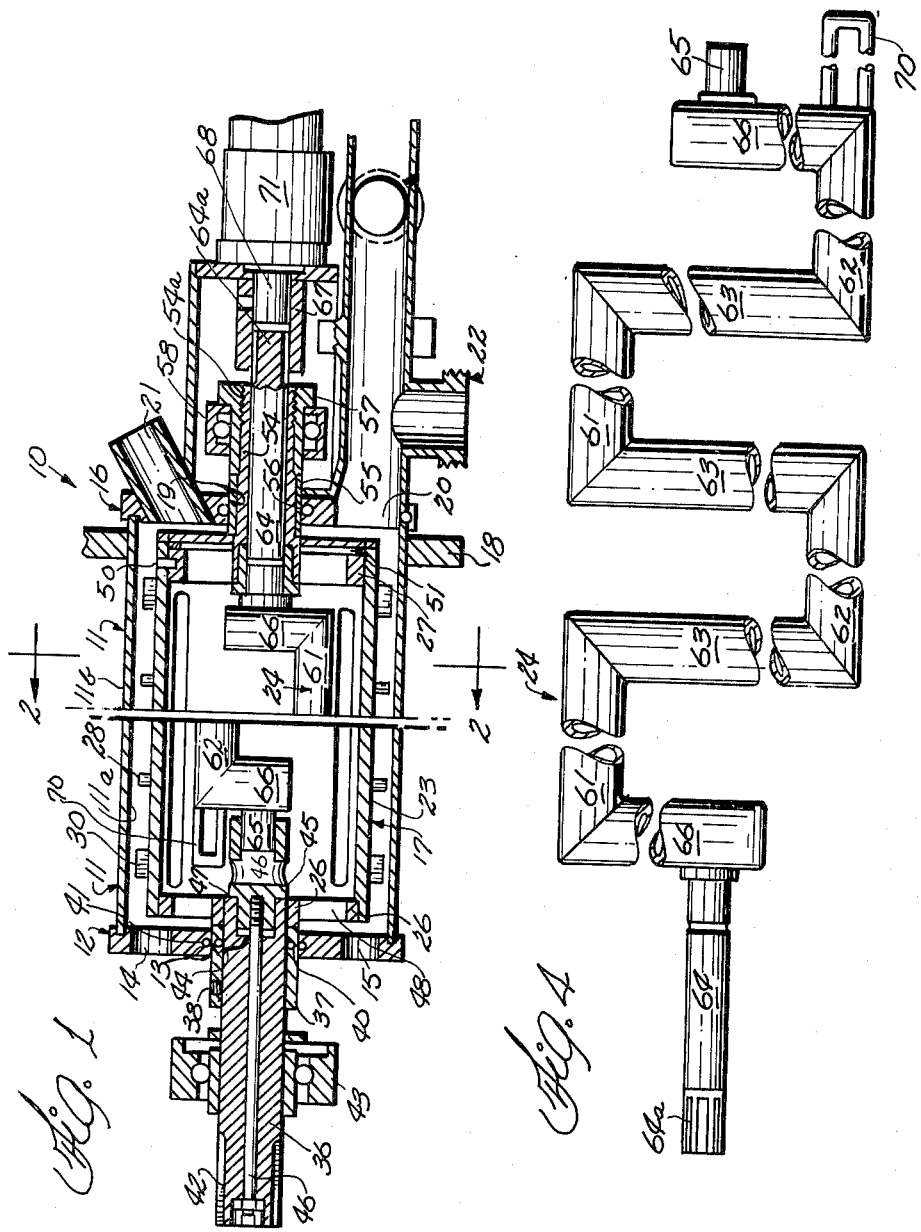

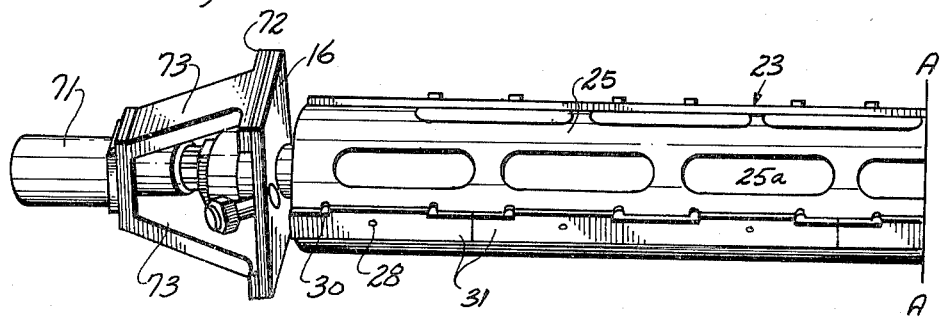
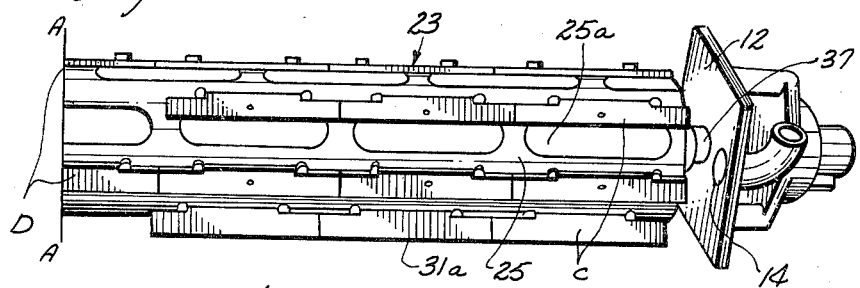
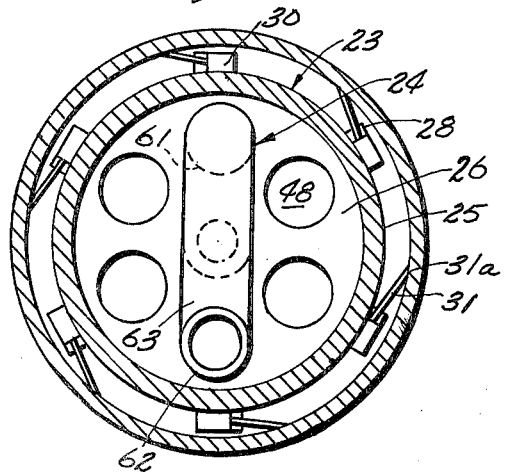

United States Patent Office 3,214,146
Patented Oct. 26, 1965

3,214,146
AGITATOR AND DASHER ASSEMBLY FOR ICE CREAM FREEZERS
Alden H. Wakeman, Lake Mills, and Dan C. Roahen, Fort Atkinson, Wis., assignors to St. Regis Paper Company, a corporation of New York
Filed Oct. 2, 1964, Ser. No. 401,265
8 Claims. (Cl. 259—105)

This application is a continuation-in-part of our application, Serial No. 319,078 filed October 25, 1963.

This invention relates to a freezer construction of a type used in the commercial production of ice cream and the like, and more particularly to the dasher-agitator assembly utilized in the freezer chamber of such a freezer construction.

The dasher-agitator assembly in question is adapted to provide accurate overrun control during the commercial production of ice cream and the like. Controlled overrun (controlled amount of air incorporated in the ice cream mix) is of importance in regard to the matters of quality as well as cost per gallon of product.

To attain such overrun control, numerous factors must be considered such as the contents or ingredients constituting the mix itself prior to aerating thereof, the rate of freezing and flow of the product through the freezer chamber, the quantity of air introduced into the freezer chamber, the pressure maintained within the chamber, and the extent and vigor of the whipping action exerted on the product while passing through the chamber.

Many of these factors may be controlled with varying degrees of success through certain improvements in the refrigeration system for the freezer chamber, and in various controls associated with the product inlet or outlet for the freezer chamber. Such improvements, however, are not the subject of the instant invention.

The construction of the dasher-agitator assembly, sometimes referred to in the trade as the dasher-beater unit or merely the dasher, and its operation are of significant importance in attaining desired control of overrun. The whipping action imparted to the product will in large measure determine whether the texture of the product will be smooth, grainy, greasy, or salvy. Excessive whipping of the product may result in protein destabilization or the conversion of some of the product fat content into butter.

Many dasher-agitator assembly designs have heretofore been proposed in an attempt to attain accurate overrun control. Such assembly designs are beset with various shortcomings, such as for example, they are not suitable for use in freezers having a high rated capacity, the power requirements for operating same are often substantial and thus, restrict to a marked degree the extensive utilization of such equipment. Prior dasher-agitator assemblies are required to be frequently disassembled and removed from the freezer chamber in order to comply with the rigid local sanitary rules, ordinances, or laws. Such frequent disassembly and removal obviously becomes a time-consuming and oftentimes laborious operation because of the weight and complexity of design of the dasher assembly. For this reason, therefore, size limitations as to the various component parts comprising such assemblies must be considered, when higher capacity output for a freezer is desired.

It is important therefore that the agitator, which is disposed within the hollow dasher, be of such configuration that substantial portions thereof are disposed in close proximity to the interior surface of the hollow dasher and thereby provide optimum whipping action to the product as it passes through the freezer chamber. In addition the agitator element should be of rigid, yet light- weight construction, so as to facilitate the handling thereof during maintenance, repair, or cleaning of the freezer equipment. Furthermore, by reason of the beater sections of the agitator being disposed adjacent the interior surface of the hollow dasher, there is a minimum amount of the agitator disposed along the axis of the dasher which is the area of minimum agitation of the product.

Thus, it is an object of this invention to provide an agitator element which is possessed of all the desirable design attributes aforenoted.

It is a further object of this invention to provide a dasher-agitator assembly wherein the dasher and agitator thereof are each rotatable independently of the other.

It is a still further object of this invention to provide a dasher-agitator construction wherein the horsepower requirements to effect independent movement of the various parts thereof are substantially less than in prior dasher-agitator constructions of comparable size.

It is a still further object of this invention to provide an agitator element which is of simple, yet sturdy, construction and is efficient in operation.

Further and additional objects will appear from the description, accompanying drawings, and appended claims.

In accordance with one embodiment of the invention, a dasher-agitator assembly is provided wherein the dasher is of an elongated, hollow, skeletal construction and is adapted to be disposed within the cylindrically shaped freezer chamber of a commercial type ice cream freezer. The dasher is power driven for rotation about its longitudinal axis. The agitator element is disposed within the hollow dasher and is power driven for independent rotation about its longitudinal axis which is coaxial with the rotary axis of the dasher. The agitator element includes a plurality of first sections which are offset from but arranged in parallel relation to the rotary axis of the element. Alternate first sections are disposed on opposite sides of the rotary axis. The agitator element also includes a plurality of second sections which are disposed transversely with respect to the rotary axis and effect interconnection of the first sections. Mounted on opposite ends of the agitator element are bearing sections, one of which is adapted to be connected to a suitable power source for imparting independent rotary motion to said element.

For a more complete understanding of this invention reference should be made to the drawings wherein:

FIG. 1 is a fragmentary vertical sectional view of the freezer chamber and the dasher-agitator assembly disposed therein; said section line passing through the central longitudinal axis of the freezer chamber.

FIG. 2 is an enlarged sectional view taken along line 2—2 of FIG. 1.

FIGS. 3A and B are fragmentary complemental perspective views of the dasher-agitator assembly.

FIG. 4 is an enlarged fragmentary side elevational view of the agitator element per se.

Referring now to the drawings and more particularly to FIGS. 1 and 2, an elongated freezer chamber 10 is shown which is of a size and shape suitable for use in a freezer utilized in the commercial production of ice cream or other similar frozen confections.

Freezer chamber 10, in the illustrated embodiment, includes a cylindrical sleeve 11 formed of metal or some other suitable material having a high coefficient of heat transfer. The interior surface 11a of the sleeve has a smooth, polished finish. The exterior surface 11b of the sleeve 1, on the other hand, may be grooved or finned to provide an extended heat transfer surface. The exterior surface 11b is submerged in or wetted by a suitable liquid refrigerant.

To one end of sleeve 11 is affixed an end plate 12 which is provided with a central opening 13 and a product inlet 14 radially spaced from the central opening. A second inlet 15 for air or the like, may also be provided which is spaced from both the central opening and product inlet. Both inlets are adapted to have connected thereto suitable conduits, not shown, communicating with sources of supply for the product (e.g. ice cream mix) and air.

Mounted on the opposite end of sleeve 11 is a second end plate 16 which is readily accessible and may be removed, when desired, for purposes of cleaning the chamber interior and removing the dasher-agitator assembly 17, the latter to be described more fully hereinafter. The exterior of sleeve 11, adjacent end plate 16, is supported by a wall 18 forming a part of a chamber in which is disposed the refrigerant for cooling the sleeve 11.

End plate 16 includes a central opening 19, a product discharge opening 20, and an auxiliary opening 21, the latter being substantially diametrically opposed with respect to discharge opening 20. Opening 21 is provided as an inspection port for the chamber interior. A suitable conduit 22 is connected to discharge opening 20 to permit the discharged product to be directed to a carton filler, not shown, or the like.

Removably mounted within chamber 10 is a dasher-agitator assembly 17. The assembly includes an elongated skeletal dasher member 23 (see FIG. 2), which is mounted for rotation about its longitudinal axis, and an elongated agitator element 24, the latter being disposed within member 23. Dasher member 23 comprises an apertured substantially cylindrically-shaped central section 25, see FIGS. 3A and B, and a pair of apertured end plates 26 and 27, see FIG. 1, secured to opposite ends of section 25.

Arranged about the periphery of section 25 are a plurality of lugs 28 and a pair of hinge posts 30 disposed in longitudinally spaced relation on opposite sides of each lug 28, see FIGS. 3A and B. Each lug and post combination is adapted to removably accommodate an elongated scraper blade 31. The leading elongated side 31a of each blade 31 is beveled to function as a scraper in removing any product which might have frozen on the interior surface 11a of the freezer chamber.

In FIG. 3B, it will be noted that one group C of blades 31 extend from the end of the dasher member 23 adjacent the end plate 12 of the freezer chamber 10 to approximately mid-length of the dasher, whereas a second group D of blades 31, arranged alternately with group C, extend substantially the full length of the dasher member. A greater or lesser number of scraper blades may be utilized, if desired. By reason of having group C blades foreshortened with respect to the overall length of dasher member 23, a somewhat reduced power input is required for effecting rotation of the dasher member.

It will be noted in FIGS. 3A and B, that dasher section 25 is provided with a plurality of elongated openings 25a which enable the product, when scraped from chamber surface 11a, to find its way into the interior of the dasher member and become readily mixed with the remainder of the product passing through the chamber.

Rotary motion is imparted to dasher member 23, through a drive shaft 36 which forms a part of and extends axially from end plate 26, see FIG. 1. Shaft 36 is provided with a wear sleeve 37 which is secured to shaft 36 by a set screw 38. An O-ring seal 40 is provided which is disposed within a suitable groove formed in the inner surface of sleeve 37 and prevents leakage of the product along the periphery of shaft 36. Sleeve 37 is disposed within the central opening 13 formed in the chamber end plate 12. Opening 13 is provided with an internal groove in which is disposed an O-ring type seal 41.

The outer end of shaft 36 is splined at 42 to accommodate a suitable coupling, not shown, leading from a separate power driving source, also not shown. The shaft 36 is supported by a suitable bearing 43 located between sleeve 37 and splined end 42.

The inner end of shaft 36 is provided with a recess 44 in which is disposed a thrust-like bearing 45. The bearing 45, in the illustrated embodiment, is held in place within recess 44 by a threaded stud 46 which extends through an axial opening formed in shaft 36. A suitable seal 47 is provided between bearing 45 and the inner end of shaft 36. Bearing 45 is adapted to accommodate one end of agitator element 24 in a manner to be described more fully hereinafter.

End plate 26 is spaced a short distance from end plate 12, see FIG. 1, and is provided with a plurality of symmetrically arranged openings 48, see FIG. 2. The openings 48 permit the product and air introduced into chamber 10 to pass into the interior of the dasher member 23.

End plate 27 is removably affixed to the opposite and of section 25 by a removable drive pin 50 and a collapsible ring 51, the latter being disposed within a suitable internal groove, formed in the end of section 25.

Attached to and extending axially outwardly from end plate 27 is a hollow shaft 54, see FIG. 1. Shaft 54 is fitted with a bearing sleeve 55 which passes through the central opening 19 formed in end plate 16 of chamber 10. Opening 19 is provided with an internal groove in which is disposed an O-ring type of seal 56. The outer end 54a of shaft 54 is threaded to accommodate a jam nut 57. The jam nut 57 is forced against the inner race of a support bearing 58, which is provided for shaft 54, and thus said nut locks up the dasher member and agitator element between the support bearings 43 and 58.

The agitator element 24, as seen more clearly in FIGS. 2 and 4, is disposed within the interior of dasher member 23. The agitator element 24 in the illustrated embodiment has a center portion, preferably formed of tubular sections 61, 62, and 63. Tubular sections 61 and 62 are offset with respect to the rotary axis of the element 24 and are interconnected by sections 63 which are disposed transversely with respect to the rotary axis. The end sections 61 and 62 are connected to a drive shaft section 64 and stub 65, respectively, by tubular transversely disposed sections 66. Drive shaft section 64 is adapted to extend through hollow shaft 54 and has the outer or distal end 64a thereof splined or provided with a keyway so as to accommodate a suitable coupling 67, which in turn, is connected to a power driven shaft 68. Preferably the outer, or beater, sections 61 and 62 of the agitator each has considerable length and has the outer periphery thereof disposed at a distance of approximately 3/16" from the interior surface of the dasher. The beater sections 61 and 62 are balanced with respect to the axis of rotation of the agitator. As seen in FIG. 2, beater sections 61 and 62 are diametrically opposed to one another, however, while this is preferred, it is not essential. The important consideration in the novel agitator design is that a substantial part of the agitator mass is disposed away from the center of the dasher interior and adjacent the dasher interior surface.

In the illustrated embodiment of the agitator, the sections thereof are of tubular construction so as to provide lightness of weight as well as strength. If desired, however, such sections may be formed of bar stock of suitable dimension. The dimensions of the transversely disposed interconnecting sections 63 and beater sections 61 and 62 will depend upon the configuration of the dasher hollow interior.

In order to effect vigorous agiation of the product and air adjacent the inlet end of the freezer chamber, a short fingerlike section 70 is provided which extends in a direction parallel to but spaced from the axis of rotation of the agitator, see FIGS. 1 and 2. The shape and size of such section may vary from that shown.

An hydraulic motor 71 or the like which provides the source of driving power for the agitator element is mounted exteriorly of the discharge end of the freezer chamber by a suitable bracket 72. The bracket includes a pair of angularly disposed arms 73. The bracket 72 is secured to the exterior surface of end plate 16, see FIG. 3A.

Rotary power is imparted to dasher 23 through the splined end 42 of hollow shaft 36, see FIG. 1. As aforementioned, to the opposite end of shaft 36 is connected thrust bearing 45 which has a portion thereof adapted to accommodate the stub 65 of agitator 24.

By reason of the power input to the agitator and dasher being separate from one another, independent speed variations to either the agitator or dasher can be effected so as to provide more accurate overrun control. For example, it has been found with the improved agitator that effective overrun control can be accomplished with the agitator being rotated at a much reduced speed (100 r.p.m.) as compared with speeds of 200–230 r.p.m. which was required with prior agitator designs while the dasher was being rotated at 200–250 r.p.m. It is apparent therefore with the new agitator that a substantial saving in the amount of horsepower expended to operate the dasher assembly is effected.

Furthermore, by reason of the independent rotation of the dasher and agitator, the dasher assembly is readily capable of being cleaned-in-place, that is to say, while it is disposed within the freezer chamber. The cleaning-in-place method, customarily referred to as CIP, greatly facilitates the cleaning of the freezer interior. When CIP is being undertaken, the dasher is held in a static-position while the agitator is rotated at full speed. Obviously before CIP occurs, the freezer is shut down and the freezer drained of the product. The product (ice cream mix) and air inlets are closed prior to the cleaning solution being introduced. Subsequent to the cleaning solution being withdrawn, the freezer chamber is thoroughly rinsed several times with hot water, before the freezer chamber is again ready to receive the product and air. The savings in both time and labor resulting from utilizing the CIP method are apparent.

Thus, it will be seen that an improved dasher assembly has been provided which is efficient, yet economical, in operation and provides a means of effecting controlled overrun in the frozen product.

While a particular embodiment of this invention has been described above, the invention is not to be limited thereto since modifications may be made thereto, and it is contemplated, therefore, by the appended claims, to cover any such modifications as fall within the true spirit and scope of this invention.

We claim:

1. In a continuous type ice cream freezer, an elongated agitator element for use with an elongated hollow skeletal dasher rotatable about its longitudinal axis, said agitator element being positionable within such dasher and being rotatable independently of such dasher about an axis coaxial with the longitudinal axis of such dasher and comprising a plurality of longitudinally spaced, elongated first sections offset from and parallel to the axis of rotation of said element, successive first sections being interconnected and angularly spaced from one another about the axis of rotation as a line of reference, bearing sections disposed at opposite ends of said element and aligned with the axis of rotation, and second sections disposed transversely with respect to the element rotary axis and connecting said bearing sections to adjacent first sections.

2. In a continuous type ice cream freezer, an elongated agitator element for use with an elongated hollow skeletal dasher rotatable about its longitudinal axis, said agitator element being positionable within such dasher and being rotatable independently of such dasher about an axis coaxial with the longitudinal axis of such dasher and comprising a plurality of longitudinally spaced first sections offset with respect to the axis of rotation of said element, alternate first sections being disposed on opposite sides of said element rotary axis, a plurality of second sections angularly disposed with respect to said element rotary axis and interconnecting said first sections, and bearing sections disposed at opposite ends of said element and coaxial with said element rotary axis.

3. The agitator element recited in claim 2 wherein said first sections are of tubular construction.

4. The agitator element recited in claim 3 wherein said first sections are offset an equal amount with respect to the element rotary axis.

5. The agitator element recited in claim 2 wherein the first and second sections are of tubular construction.

6. The agitator element recited in claim 5 wherein said second sections are disposed transversely with respect to said element rotary axis.

7. In a continuous type ice cream freezer having an elongated cylindrically-shaped freezer chamber, an elongated hollow skeletal dasher member positionable within such freezer chamber and power driven for rotation about its longitudinal axis, and an elongated agitator element mounted within said dasher member and independently power driven for rotation about its longitudinal axis, the longitudinal axes of said agitator element and said dasher member being coaxial; said agitator element comprising a plurality of longitudinalaly spaced tubular first sections offset with respect to said element rotary axis, alternate first sections being disposed on opposite sides of said rotary axis, corresponding portions of the outer periphery of each of said first sections being in close proximity to the interior surface of said dasher member, a plurality of tubular second sections disposed transversely with respect to the element rotary axis and interconnecting said first sections, and bearing sections disposed at opposite ends of said agitator element and coaxial with said element rotary axis.

8. The agitator element recited in claim 7, wherein an elongated third section is mounted on one end of said agitator element, said third section being in spaced substantially parallel relation with respect to one of said bearing sections, said third section being in substantial alignment with one of said first sections.

References Cited by the Examiner
UNITED STATES PATENTS

| | | | |
|---|---|---|---|
| 1,497,454 | 6/24 | Light | 259—132 |
| 1,692,963 | 11/28 | Thompson | 259—9 |
| 1,693,016 | 11/28 | Bagby | 259—9 |

CHARLES A. WILLMUTH, *Primary Examiner.*